United States Patent
Green et al.

(10) Patent No.: US 6,481,344 B1
(45) Date of Patent: Nov. 19, 2002

(54) FLAMELESS FLAVOR ENHANCING SMOKE GENERATOR

(75) Inventors: Margaret Jane Green, Rt. 2, Box 161-B, Buckholts, TX (US) 76518; Forrest Lee Green, Buckholts, TX (US)

(73) Assignee: Margaret Jane Green, Buckholts, TX (US)

( * ) Notice: Subject to any disclaimer, the term of this patent is extended or adjusted under 35 U.S.C. 154(b) by 0 days.

(21) Appl. No.: 09/943,768

(22) Filed: Aug. 30, 2001

(51) Int. Cl.[7] .............................. A23L 1/01; A23B 4/04
(52) U.S. Cl. ........................................... 99/482; 99/467
(58) Field of Search ........................... 99/467, 481–483, 99/340, 446, 399, 516, 480; 426/235, 314, 315; 126/25 R, 25 A, 59.5, 79; 131/329, 330, 185, 200; 110/108, 102, 118, 196; 206/525, 524.6

(56) References Cited

U.S. PATENT DOCUMENTS

| | | |
|---|---|---|
| 549,017 A | 10/1895 | Prewitt |
| 620,842 A | 3/1899 | Elliott |
| 1,302,682 A | 5/1919 | Legg |
| 1,536,692 A | 5/1925 | Scheu |
| 1,963,501 A | 6/1934 | Mitchell ..................... 299/20 |
| 2,246,804 A | 6/1941 | Lipschutz ................... 99/223 |
| 2,967,023 A | 1/1961 | Huckabee ..................... 239/60 |
| 2,984,171 A * | 5/1961 | Lee, Sr. ..................... 99/482 X |
| 3,333,526 A | 8/1967 | Kirkpatrick .................. 99/260 |
| 3,788,301 A | 1/1974 | Terry ......................... 126/59.5 |
| 4,779,525 A * | 10/1988 | Gaines ........................ 99/482 |
| 5,048,406 A * | 9/1991 | Cofer ......................... 99/482 |
| 5,138,939 A | 8/1992 | Bradley ...................... 99/482 |
| 5,193,445 A * | 3/1993 | Ferguson ..................... 99/482 |
| 5,215,004 A | 6/1993 | Su ............................. 99/483 |
| 5,505,121 A | 4/1996 | Spector ....................... 99/290 |
| 5,552,577 A | 9/1996 | Su ............................ 219/401 |
| 5,653,162 A | 8/1997 | Lunde ......................... 99/450 |
| 6,019,035 A * | 2/2000 | Jonas et al. .................. 99/482 |

FOREIGN PATENT DOCUMENTS

FR         2601852      1/1988

\* cited by examiner

*Primary Examiner*—Timothy F. Simone
(74) *Attorney, Agent, or Firm*—Buskop Law Group, P.C.; Wendy Buskop

(57) ABSTRACT

A smoke generating device for use in providing flavored smoke in a controlled manner comprising: non combustible, sealed, pressurizable container; organic matter disposed within the container, wherein the organic matter is capable of producing a smoke without igniting; and at least one perforation in said container which enables the container to become pressurized such that smoke flows out of the container in a controlled direction and at a velocity that does not combust during heating of the container.

16 Claims, 2 Drawing Sheets

FLAMELESS FLAVOR ENHANCING SMOKE GENERATOR

BACKGROUND OF THE INVENTION

It has been found that the prior art of smoke generators are not directional, not disposable, and are constructed so that the vapors produced by the generators burn when exposed to the heat source used with the smoke generator. Therefore it is an object of the present invention to provide a smoke generator which may obviate and mitigate the above-mentioned drawbacks.

Various patents have been located which deal with the subject matter of this invention in one way or another, but none has provided a non-combustible, pressurizable device with directional smoke control which can be easily used in a home, or while camping, and is either recyclable or disposable, see for example U.S. Pat. No. 549,017 to Prewitt, U.S. Pat. No. 620,842 to Elliott, U.S. Pat. No. 1,302,682 to Legg, U.S. Pat. No. 1,536,692 to Scheu, U.S. Pat. No. 1,963,501 to Mitchell, U.S. Pat. No. 2,246,804 to Lipschutz, U.S. Pat. No. 2,967,023 to Huckabee, U.S. Pat. No. 3,333,526 to Kirkpatrick, U.S. Pat. No. 3,788,301 to Terry, U.S. Pat. No. 5,138,939 to Bradley, U.S. Pat. Nos. 5,215,004 and 5,552,557 to Su, U.S. Pat. No. 5,505,121 to Spector and U.S. Pat. No. 5,653,162 to Lunde, all of which are incorporated by reference. In addition, French patent 2601852 is also noted and incorporated by reference. The smokers of the earlier patents of particular note are mostly apparatus mounted to caster wheels, with removable fireboxes, or as in the case of Huckabee, a closed receptacle for holding hickory chips which releases precise amounts of smoke to escape when the receptacle is heated or placed inside a heated area. In addition, Su '557 describes a multi-purpose cooker for steaming, drying or boiling foodstuff.

SUMMARY OF THE INVENTION

A smoke generating device for use in providing flavored smoke in a controlled manner comprising: non combustible, sealed, pressurizable container; organic matter disposed within the container, wherein the organic matter is capable of producing a smoke without igniting; and at least one perforation in said container which enables the container to become pressurized such that smoke flows out of the container in a controlled direction and at a velocity that does not combust during heating of the container

DETAILED DESCRIPTION OF THE PREFFERED EMBODIMENTS

Figure 1:
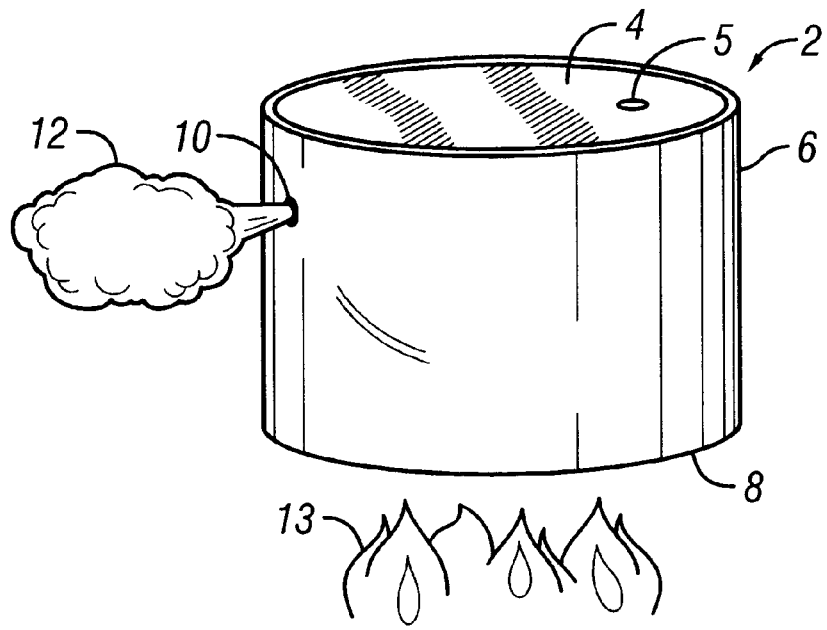
FIG. 1 is a side view of a 6 oz cylinder embodiment of the invention.

Before explaining the present invention in detail, it is to be understood that the invention is not limited to the particular embodiments and that it can be practiced or carried out in various ways.

The present invention relates to a device for providing smoke without burning into a cooking environment, or a fireplace with a vent with the ability to provide directional smoke emitted at a velocity so that the particles in the smoke do not catch on fire or burn. It is for a flameless-flavor smoke generator that can add moist wood smoked and spice flavors to foods cooked on any type of vented oven or outside grill. It is even contemplated to use the device in areas such as in a fireplace or in and around any areas of any dwelling such as a home to provide a desired pleasant aroma or fragrance to the dewelling. It can used in restaurants or by anyone who cooks at home or when camping. It is even contemplated that the smoke generated can be used in, under or around homes and buildings to fumigate and rid the areas of odors and nasty smells.

This flavor smoke generator will add moist wood and spice flavors to foods without the necessity of using firewood, allowing foods to have a natural wood smoked flavor with less burning and carcinogens than when using open flame wood or charcoal. The foods can have these flavor benefits on gas and electric grills, or ovens with no ashes to clean and dispose of after cooking. The device is small, neat and economical. The container is contemplated to be biodegradable and after it issued for cooking, it can be used as fertilizer at the base of trees and plants to provide many essential elements for healthy plant growth. It is even contemplated to use the device in areas such as in a fireplace or in and around any areas of any dwelling such as a home to provide a desired pleasant aroma or fragrance to the dewelling.

The device is preferably made from a non-combustible container. This container can be a sealed can, which can be made from steel, stainless steel, aluminum, cooper ceramic, brass, a recycled metal, alloys of any of these metals, or combinations thereof. It is also contemplated the container made be made from a sturdy clay material or multiple layers of thin metal, or even a ceramic and glass combination material. It is possible that the device is made from a coated container, which improves the ability of the container to withstand combustion, increasing the type of material that the container can be made from, to items like coated glass, and coated ceramics, or even biodegradable materials. The container is contemplated so that food could be placed on top of the device and then cooked, baked, or steamed on the surface. It is even possible that the top of the device could be used as a boiler.

The container can be of various sizes and shapes. It is contemplated that the container can contain anywhere from 1 cubic inch volume to barrel size containers, provided the container is short and squat. If a container is too deep, the invention will not work, as effectively, as the bottom will then charcoal, creating an insulating layer which prevents adequate heat from reaching all material in the container above this charcoal layer thereby reducing the effectiveness of the smoke generator. Ideally, the container needs to be a low profile, short container, which is ideally, wider than it is tall. The optimum height range for cans having volume from about 2 to 16 ounces is about 1 to 3 inches. Using conventional can sizes, the device can be a container which can contain from 1 oz to over 300 oz of material. A can which is contemplated as usable would be a recyclable (3 oz) cylindrical tuna fish metal can, a 6 oz can of food, like Spam, or a recyclable sardine can (12 oz size) which is preferably oval in shape. The sardine can is considered the most preferred embodiment shape of this invention. Alternatively up to a 16 oz can may be used, or even larger can sizes.

The container must be able to be sealed, top, bottom and sides and capable of supporting some vapor or air pressure which is more than 1 atm. For example, the container needs to be a shape and have structural integrity which enables it to withstand at least 0.0156 psi. The pressurization of the container occurs when the material in the container is exposed to elevated temperatures, causing that material to smolder and smoke, but not burn. Upon smoldering or smoking, the pressure in the container rises, so that the smoke can exit the container at a high enough velocity so that the smoke and accompanying vapors do not ignite while near the heat source. It is contemplated that in the most preferred embodiment, the pressure in the can would be at least 0.0156 psi upon heating. The pressure in the can could be more than one ounce per square inch, and for example, could be one or two pounds per square inch, and the smoke should be expelled at a velocity adequate to inhibit the burning of the vapors being emitted from the container.

The device is contemplated to work best having at least one perforation or hole in a side wall of the container. The hole is thought to be small enough to cause the pressure build up when the container is exposed to heat. More than one hole or perforation can be disposed in the side wall, but in the preferred embodiment, if more than one hole is in the side wall, then the holes would be located near each other, between 0.5 and 1 inch apart, and maybe even closer. If more than one hole is used, the areas of the holes should be no more than the total area of a perforation which utilizes only one hole. As the containers increase in size, the perforation holes will increase in diameter proportionately to the size of the container or device. This close orientation of the holes enables the device to be oriented so that the user can direct the smoke or vapor in a specific direction.

The holes are most preferably one to three in number, but it is contemplated that a very large container could have up to 100 small holes. The one to three holes are clustered near each other so that device can be oriented so that the smoke can be directionally controlled and are preferably in diameter of about $1/8$ inch, more preferably about $1/16^{th}$ inch to about $1/32^{nd}$ inch in diameter. It is preferred that the holes be located near the top side of the container, so that the smoke does not venture in to the coals of the fire, and the aroma or fragrance can more easily permeate a dwelling without causing smoke damage or harm from smoke inhalation to the inhabitants. Holes are near the top of the container but on the side of the container, so that food can be put on the top of the container in the fire and cooked and smoked at the same time, thereby flavoring the food.

Within the scope of the invention, it is contemplated that small pieces of organic matter are disposed within the device to add flavor or to provide a desired pleasant aroma or fragrance to any dwelling. These materials can be herbs, spices, leaves, plant matter, a single piece of perforated wood, wood chips, palletized sawdust, sawdust, palletized wood, small pieces of wood, wood fragments, non-wood organic plant matter, including but not limited to herbs, corn husks, beans, and dried field matter, and combinations of these.

Heating the can causes pressurization of the small pieces of organic matter, permitting the smoke to leave the container at a velocity so that the smoke does not ignite and burn. Additional flavor capsules can be added to the multiple pieces of matter, such as spices, herbs and combinations thereof. These additional spices can be in capsules, which also contain some water, the water vaporizing upon heating permitting the spices to intermingle with the flavored smoke. Different woods are considered usable as the organic matter, including but not limited to mesquite, hickory, oak, cherry, apple, pecan, orange, black walnut, sassafras, sugar maple, mulberry and woods flavored with chemicals.

It is contemplated that the heating of the can be with conventional heat sources, which can include open flames, such as an outdoor fire or fire pit which burns wood, a burning wood fire in a house, an electric burner, a gas burner, a charcoal fire, natural gas fireplaces, propane based heat sources, and combinations of these. The heating occurs so that the container's temperature rises, and the multiple pieces of matter in the container start to smoke, and the smoke is then released from the container through the perforations at a velocity which is sufficient to prevent the burning of the smoke and accompanying vapors by the heat source. The at least one perforation in the container enables the container to become pressurized such that the produced smoke flows out of the container in a controlled direction and at a velocity that does not combust during heating of the container.

It is contemplated that this device can be used to fumigate a dwelling. It is also contemplated that this device can be used to provide a fragrance for a vented fire in a fireplace.

FIG. 1 shows a cylindrical 6 oz. embodiment of the invention, wherein the device 2 has a top 4, a side wall 6, a bottom 8 and a pressure release hole 5 wherein a relief valve or relief pin 18 (shown in FIG. 3) is disposed. This is a sealed container approximately 1.25 to 1.5 inches tall for containing wood chips 14 (shown in FIG. 2), preferably made from woods, such as cherry wood, apple wood, pecan, peach, orange, black walnut, sassafras, sugar maple, mulberry, mesquite wood or maple, oak, hickory or pear wood. Additionally, woods which have been flavored with other chemicals, such as whiskey, hot peppers, hot sauces, can be used within the scope of this invention. The container is most preferably a steel can. The container may have other shapes other than the traditional conical or cylindrical can shape, and it is contemplated that the container or can may have a shape that is cubic, spherical, diamond, ellipsoid, oval or rectangular. The can could be coated, and still usable in this preferred embodiment.

A perforation 10 is shown which has a diameter of $1/8^{th}$ to $1/16$th inch disposed in the wall 6 of the device or sealed container 2. Other sizes will operate also. Approximately 3 oz. of wood chips could be disposed in the sealed container 2. Upon heating of the container 2 using flame 13, smoke 12 would expel from the perforation 10 to provide smoke 12 which then adds an aroma or fragrance throughout a dwelling. The temperature of the air inside the can would be maintainable preferably between 140 degrees Fahrenheit and about 450 degrees Fahrenheit.

Figure 2:
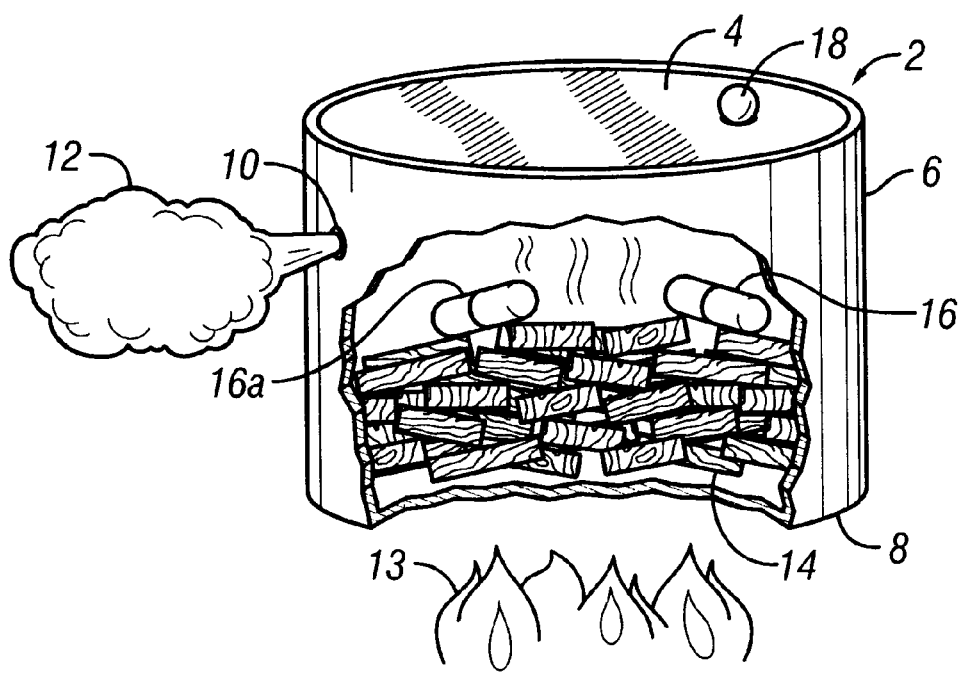
FIG. 2 is a cross sectional view of a 12 oz cylinder embodiment of the invention showing the wood chips disposed in the container.

FIG. 2 shows a cross section of a 12 oz can cylindrical embodiment of the invention, wherein the device 2, has a top 4, side wall 6 being shown, and a bottom 8. In the container 2 are wood chips 14, a flavor capsule 16 and relief valve or relief pin 18 disposed in pressure release hole 5. Since a number of flavor capsules may be used, an additional flavor capsule 16a is shown. In the side wall 6, near the top 4, is at least one perforation 10 having a diameter of $1/8$ inch from which smoke 12 can emit upon heating of the wood chips 14 in the container 2. The operating pressure can bee about 0.0156 psi, and the operating temperature can range between 140 and 450 degrees Fahrenheit.

It is contemplated that the device can be two similar shaped devices joined together in order to achieve bi-directionality for the smoke.

Figure 3:
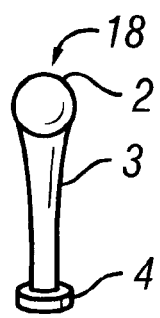
FIG. 3 is a detail of a relief pin usable within the scope of the invention.

FIG. 3 is a detail of a relief pin 18 which can be used to release the excess pressure built up in the disposable smoker because of excessive heat in the can, because the perforation 10 becomes inadvertently blocked, or because the perforation is omitted from the can. The pin has top 2, shaft 3 and a retaining flange 4 for holding the pin to the can, preventing complete expulsion of the relief pin form the can. In FIG. 3, the shaft 3 is tapered to prevent explosion.

Figure 4:
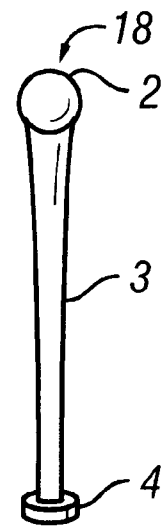
FIG. 4 is a detail of another relief pin usable within the scope of the invention.

FIG. 4 shows another embodiment of shaft 3 with a tapered configuration for the reusable or non-disposable generator. The tapered shaft would permit a more gradual release of pressure.

In the reusable or non-disposable version it is contemplated that the can would be of the same shape, but could be made from a more sturdy material, such as brass. Similarly, the relief pin as shown in FIG. 4 could be brass having a brass pipe to encompass the relief pin. The head of the relief pin the preferred embodiment would be about ⅜ inch in diameter. Similarly, the pipe would be hollow having a shaft of about ⅛ inch diameter and 2 inches length. If the reusable can is exposed to extreme heat or the perforation 10 is blocked, the pressure in the can could rise to the point which could possibly cause the can to explode.

Figure 5:
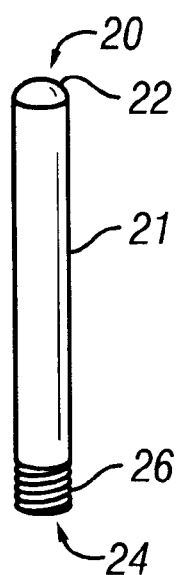
FIG. 5 is detail of a portion of another relief pin usable with a non-disposable version of the invention.

FIG. 5 shows a pipe 21 which can contain a relief pin that is usable with a reusable version of the present invention. In this embodiment, pipe 21 is a hollow pipe having a shaft 20 and an opening 22 on one end and an opening 24 on the other end of the pipe 21. The opening 24 of the pipe can have threads 26 disposed on the outer diameter of the pipe, the threads are used for engaging the top 4 of the smoker or sealed container 2. In the disposable embodiment, the hole in the top 4 of the sealed container 2 may be ⅛ inch in diameter and the relief pin can be inserted directly into the pressure release hole 5 in the top of the can. If the pressure in the can rises above the optimum working pressure, then the pin will rise to release any excess pressure.

Figure 6:
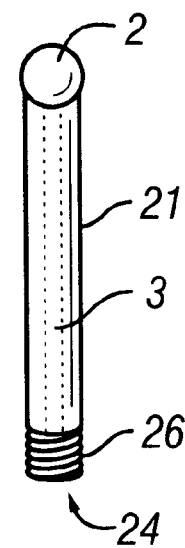
FIG. 6 is a detail of the relief pin engaged in the hollow pipe non-disposable version of the present invention.

FIG. 6 is a view of the pipe 21 containing the relief pin 18 with the tapered shaft 3 embodiment. The relief pin in this embodiment could be a 3 inch brass tapered pin having a head with about a ½ inch in diameter and a shaft which is tapered and about 3 inches in length. The shaft is tapered to have ¼ inch diameter at the top and ⅛ inch diameter at the bottom. This second embodiment of the pressure relief system works in the following manner, when pressure builds up, the pressure lifts the pin, sliding it upward in the can. Without this safety system, if the exhaust hole 10 becomes obstructed or is omitted during the manufacturing of the device, the smoke generator could explode.

With the reusable system for flameless flavor enhancing, a brass tube or pipe can be used having a bottom end with male threads on one end, what can be screwed into the top of the smoke generator. The top of the generator will have ⅛ inch threaded holes to receive the ⅜×2 inch threaded pipe 21.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

What is claimed is:

1. A smoke generating device for use in providing flavored smoke in a controlled manner comprising:
   a. non combustible, sealed, pressurizable container;
   b. organic matter disposed within the container, wherein said organic matter produces smoke without igniting;
   c. at least one perforation in said container enables the container to become pressurized such that smoke flows out of the container in a controlled direction and at a velocity that does not combust during heating of the container; and
   d. flavor capsules disposed adjacent the organic matter which comprise water containing aroma.

2. The device of claim 1, wherein said heating of the container by a heat source is to a temperature adequate to cause the organic matter to smoke without igniting, and for the smoke to release from the container at a velocity which is sufficient to prevent burning of the smoke by the heat source.

3. The device of claim 1, wherein said container is of sufficient strength and integrity to withstand heating of the multiple pieces of organic matter as well as to withstand the pressure buildup inside the container during heating of the container.

4. The device of claim 2, wherein said container is comprised of aluminum, steel, stainless steel, copper, ceramic, brass, recycled metals, alloys thereof, or combinations thereof.

5. The device of claim 2, wherein said container is biodegradable material.

6. The device of claim 1, wherein said organic matter consists of: wood chips, pelletized sawdust, sawdust, pelletized wood, small pieces of wood, non-wood organic plant material, herbs and combinations thereof.

7. The device of claim 6, wherein said organic matter is a single piece of perforated wood.

8. The device of claim 1, wherein the aroma is a member of the group: woods, spices, herbs, and combinations thereof.

9. The device of claim 1, wherein said container is a cylindrical 6 oz container having a top, bottom and side wall, and said at least one perforation is disposed in said side wall near said top and said perforation has a diameter of about ⅛ inch.

10. The device of claim 9, wherein the diameter of said perforation is between about $\frac{1}{32}^{nd}$ and about $\frac{1}{8}^{th}$ inch in diameter.

11. The device of claim 1, wherein said container is a cylindrical 6 oz container having a top, bottom and side wall, and comprises three perforations with all perforations disposed within 0.5 inch of each other near the top of said container, and wherein each perforation has a diameter of about $\frac{1}{32}^{nd}$ to about $\frac{1}{16}^{th}$ of an inch.

12. The device of claim 1, wherein said container has a shape that is a member of the group: cubic, cylindrical, conical, spherical, diamond, ellipsoid, oval, and rectangular.

13. The device of claim 1, wherein said container is a cylindrical 12 oz container having a top, bottom and side wall, and wherein said at least one perforation disposed in said side wall has a diameter of between about ⅛ inch and about 1/16 inches.

14. The device of claim 1, wherein said device is used for flavoring food with said smoke.

15. A smoke generating device for use in providing flavored smoke in a controlled manner comprising:
   a. non combustible, sealed, pressurizable container;
   b. organic matter disposed within the container, wherein said organic matter produces smoke without igniting;
   c. at least one perforation in said container enables the container to become pressurized such that smoke flows out of the container in a controlled direction and at a velocity that does not combust during heating of the container; and
   d. a relief pin comprising a top and a shaft is disposed in the top for emergency pressure release.

16. The device of claim 15, wherein said relief pin comprises a tapered shaft.

* * * * *